United States Patent [19]

Davies et al.

[11] 4,305,255

[45] Dec. 15, 1981

[54] COMBINED PILOT AND MAIN BURNER

[75] Inventors: James F. A. Davies; James R. Baker; Arthur Sotheran, all of Bristol, England

[73] Assignee: Rolls-Royce Limited, London, England

[21] Appl. No.: 90,977

[22] Filed: Nov. 5, 1979

[30] Foreign Application Priority Data

Nov. 20, 1978 [GB] United Kingdom ............... 45179/78

[51] Int. Cl.³ ............................. F02C 3/14; F23R 3/32
[52] U.S. Cl. .......................................... 60/741; 60/746
[58] Field of Search ................. 60/741, 746, 747, 742, 60/261; 251/61.2; 137/561 R

[56] References Cited

U.S. PATENT DOCUMENTS

| | | |
|---|---|---|
| 2,590,853 | 4/1952 | Fulton . |
| 2,724,239 | 11/1955 | Fox . |
| 3,247,967 | 4/1966 | Kucmerosky . |
| 4,157,012 | 6/1979 | Dubell ................................. 60/742 |
| 4,194,358 | 3/1980 | Stenger ................................ 60/747 |
| 4,208,031 | 6/1980 | Jonak ................................ 251/61.2 |

FOREIGN PATENT DOCUMENTS

| | | |
|---|---|---|
| 1915634 | 11/1969 | Fed. Rep. of Germany . |
| 945035 | 4/1949 | France . |
| 1028959 | 6/1958 | France . |
| 1490068 | 7/1967 | France . |
| 1535611 | 7/1968 | France . |
| 2186601 | 1/1974 | France . |

*Primary Examiner*—Robert E. Garrett
*Attorney, Agent, or Firm*—Stevens, Davis, Miller & Mosher

[57] ABSTRACT

The invention relates to a fuel system for a gas turbine engine wherein an annular combustion chamber 10 has an annular series of pairs of first and second nozzles 15,16. In one mode of operation fuel is supplied only to the first nozzles 15. In another mode, fuel is supplied also to the second nozzles. The change has to be made during operation of the engine. If the first and second nozzles had separate supply manifolds, the manifold pertaining to the second nozzles would have to be primed and purged respectively when initiating and terminating the use of the second nozzles. To avoid this difficulty the first and second nozzles are supplied by a single manifold 12 and the second nozzles are controlled by individual valves 21 situated close to the latter nozzles and operated collectively by a fluid pressure supply 26,27.

2 Claims, 3 Drawing Figures

COMBINED PILOT AND MAIN BURNER

This invention relates to a gas turbine engine having a combustion system comprising an annular combustion chamber including first fuel injection nozzles fed with fuel for a low power operating range, and second fuel injection nozzles fed with fuel, along with said first nozzles, for a high power operating range of the engine.

Since the change from the low power to the high power range has to be made while the engine is operating, it can be a difficulty to provide a system for controlling the priming of any fuel manifold leading to the second nozzles. Similarly, since such a manifold would have to be purged when changing from the high power to the low power range, it can be a difficulty to provide a system for controlling such purging. It is an object of this invention to alleviate or overcome this difficulty.

According to this invention there is provided a gas turbine engine having a combustion system comprising an annular combustion chamber, an annular array of pairs of radially spaced apart first and second nozzles, a fuel supply manifold having branch ducts leading to the respective pairs of nozzles, each branch duct being connected to the first nozzle of a respective pair directly and to the second nozzles of a respective pair through a shut-off valve.

The provision of a said cut-off valve in respect of each of said manifold branch ducts substantially reduces the volume of any passage through which fuel has to pass when the second nozzles are to be supplied with fuel so that neither priming nor purging are necessary.

An example of a gas turbine engine having a combustion system according to this invention will now be described with reference to the accompanying drawings wherein FIG. 1 is a sectional elevation of the combustion chamber region of the engine.

Figure 1:
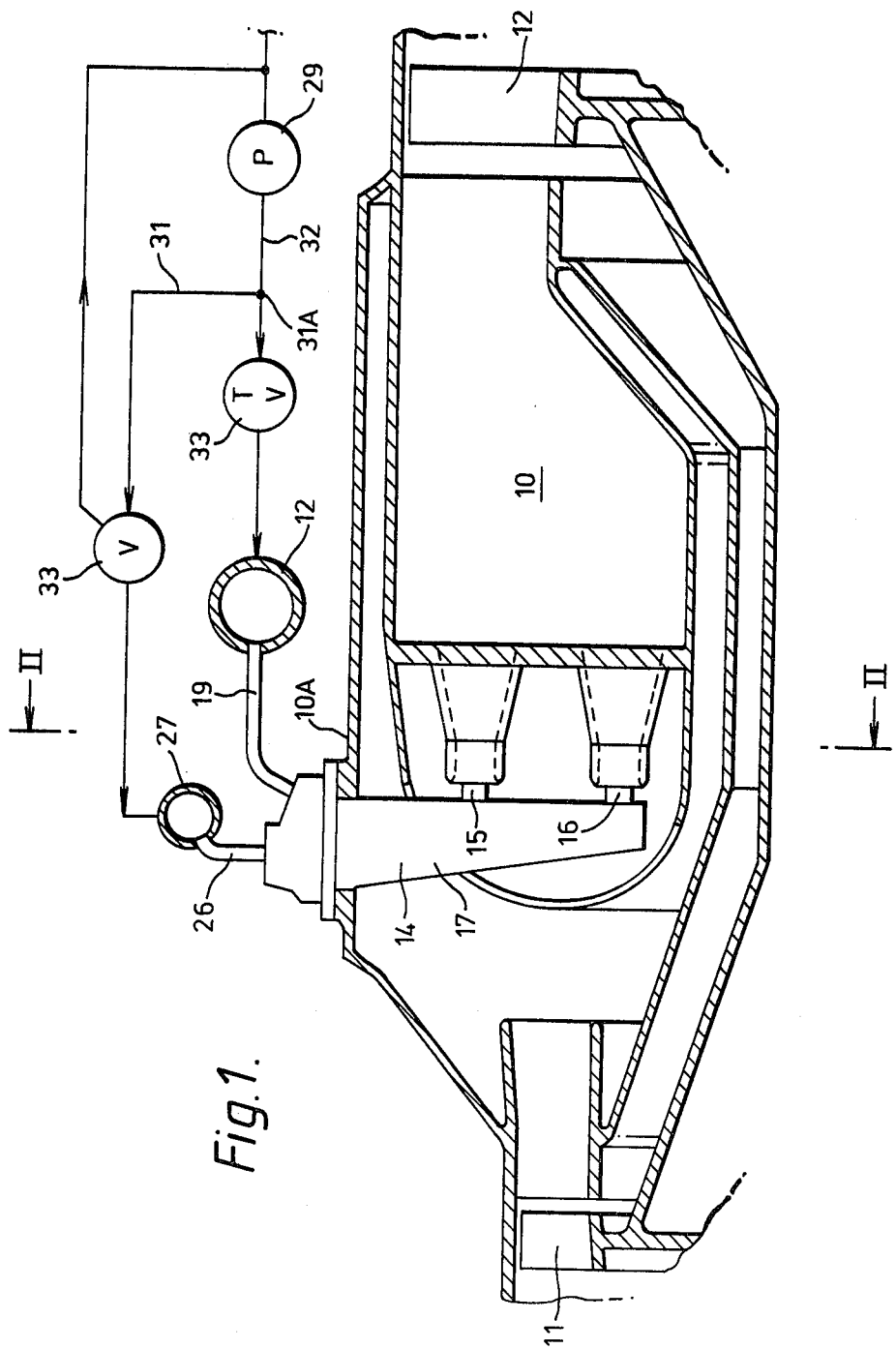
Figure 2:
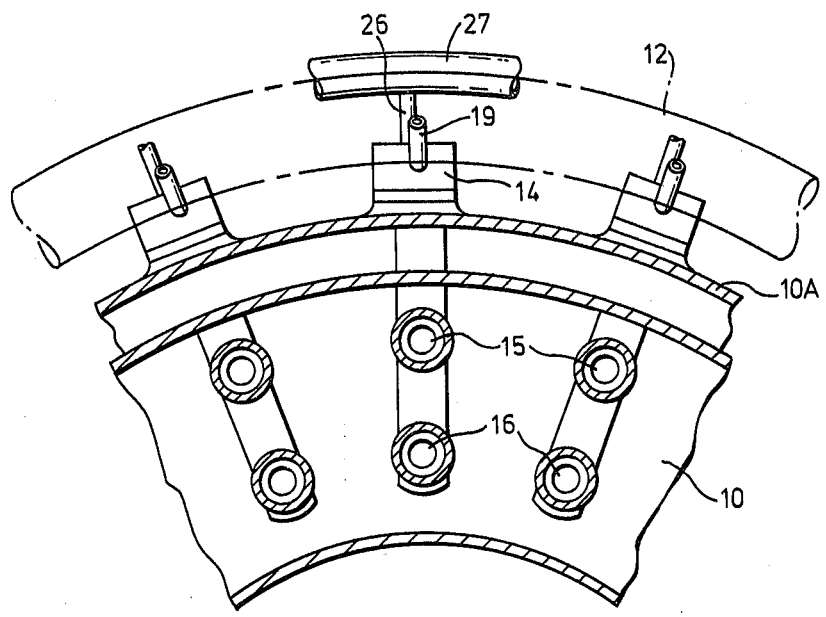
FIG. 2 is a section on the line II—II in FIG. 1.

Referring to FIG. 1, an annular combustion chamber 10 receives air from a compressor 11 and fuel from a fuel supply manifold 12, and discharges combustion products through a turbine 12 connected to drive the compressor. The manifold feeds a number of fuel injectors 14 distributed around the annulus of the combustion chamber. Each injector has a first or pilot nozzle 15 and a second or main nozzle 16. In use fuel is injected into the combustion chamber through the pilot nozzle during a low speed range of the engine, say between idle and 30% of maximum thrust. Above that range fuel is also injected through the main nozzle 16. The nozzles 15,16 are supported by an elongate structure or housing 17 having an end 17A supported by a casing 10A surrounding the combustion chamber 10. The housing 17 extends from the casing 10A radially inwardly into the combustion chamber 10, the nozzle 16 being situated at the end 17B and the nozzle 15 being situated at a location intermediate between the ends 17A,17B. Each housing 17 contains a passage 19A extending the full length of the housing and connected at the end 17B to a further passage 19B leading directly to the nozzle 15. The passages 19A,19B are parts of the branch duct 19. The nozzle 16 is connected to the passage 19A through the intermediary of a shut-off valve 21.

The valve 21 has a closure member 22 connected by a stem 23 to one side of a diaphragm 24 contained in a chamber 25 at the end 17A of the housing. At the other side of the diaphragm, the chamber 25 is connected to a branch duct 26 of a pressure supply manifold 27. The valve 21 is normally open by virtue of a bias of the diaphragm. When it is desired to close the valves 21 of the respective injectors 14, pressurized fuel is supplied from a continually operating pump 29 (FIG. 1) through a three-way control valve 30 to a supply duct 31 of the manifold 27.

The valve 21 is a lift valve arranged to directly control a port 18 leading into the nozzle 16. Thus, when the valve 21 is being opened, fuel is immediately available at the main nozzle 16 and there is no need to prime any feed passage, e.g. a separate manifold feeding the nozzles 16, leading to the port 18. Correspondingly when the valve 21 is being closed, there is no such feed passage which needs to be purged to ensure a clean cut-off of the fuel.

Figure 3:
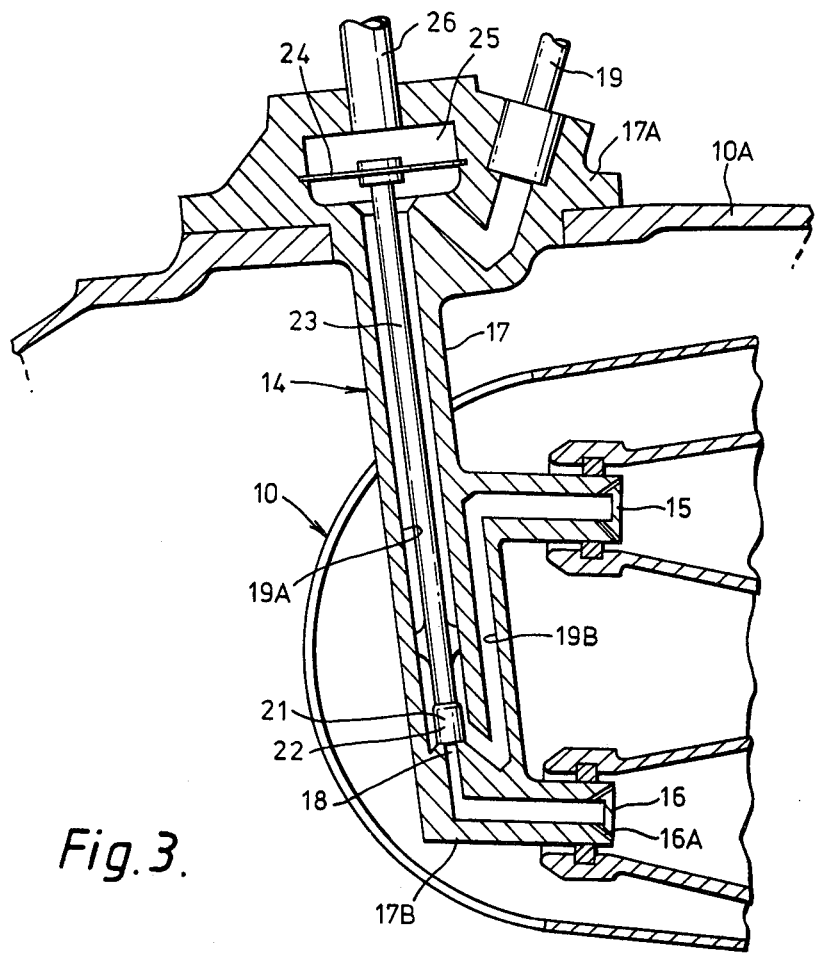
FIG. 3 is an enlarged sectional detail of FIG. 1.

The passage 19A surrounds the stem 23 as shown (FIG. 3) so that the relatively low temperature of the incoming fuel is available for cooling the stem 23 as well as the surrounding part of the housing 17.

The pump 29 is primarily intended for feeding a supply duct 32 to the manifold 12 and contains a throttle valve 33 for regulating the fuel supply to the nozzles 15,16. The duct 31 is connected to the pump 29 at a point 31A upstream of the valve 33. Since the valve 33 constitutes a flow restrictor, the pressure in the duct 31 and, on opening of the valve, the pressure in the manifold 27 must always be higher than the pressure in the manifold 12. Therefore, on opening of the valve 33 the pressure in the manifold 27 is sufficient to act on the diaphragm 24 in the sense of closing the valve 21.

We claim:

1. A gas turbine engine having a combustion system comprising a casing, a combustion chamber situated within the casing, elongate housings each having an end supported on the casing and a free end situated adjacent the combustion chamber, each housing containing a fuel supply duct extending therealong, a first nozzle arranged on the housing in a position intermediate between the ends thereof, a second outlet nozzle arranged in the housing at the free end thereof and connected to the duct through a shut-off valve having a closure member, an operating rod connected to the closure member and extending therefrom through said duct to a position adjacent said supported end of the housing, and means provided at said supported end for operating the rod to open or close said closure member.

2. A gas turbine engine according to claim 1 wherein said duct extends from said supported end toward said free end to a position at said closure member and therefrom forward of the supported end to a position at said first nozzle, such that fuel supplied to said first nozzle passes around said closure member.

* * * * *